(12) United States Patent
Cheng

(10) Patent No.: US 7,335,301 B2
(45) Date of Patent: Feb. 26, 2008

(54) FOLD PROTECTION FOR SPIRAL FILTRATION MODULES UTILIZING UV CURED ADHESIVE AND METHOD OF PROVIDING SAME

(75) Inventor: Haitao Cheng, Wilmington, MA (US)

(73) Assignee: Koch Membrane Systems, Inc., Wilmington, MA (US)

( * ) Notice: Subject to any disclaimer, the term of this patent is extended or adjusted under 35 U.S.C. 154(b) by 668 days.

(21) Appl. No.: 10/302,391

(22) Filed: Nov. 22, 2002

(65) Prior Publication Data

US 2004/0099598 A1 May 27, 2004

(51) Int. Cl.
*B01D 63/10* (2006.01)
*B01D 63/12* (2006.01)
*B01D 61/00* (2006.01)

(52) U.S. Cl. .............. 210/321.85; 210/321.76; 210/650; 210/652; 156/290; 156/325; 156/330; 156/334

(58) Field of Classification Search ............... 210/650, 210/652, 321.76, 321.85; 156/290, 325, 156/330, 334
See application file for complete search history.

(56) References Cited

U.S. PATENT DOCUMENTS

| | | | |
|---|---|---|---|
| 4,842,736 A | 6/1989 | Bray et al. | |
| 5,102,552 A | 4/1992 | Callahan et al. | |
| 5,146,531 A | 9/1992 | Shustack | |
| 5,147,541 A | 9/1992 | McDermott, Jr. et al. | |
| 5,232,593 A | 8/1993 | Pedersen et al. | |
| 5,366,625 A | 11/1994 | Pedersen et al. | |
| 5,464,538 A | 11/1995 | Schmidt et al. | |
| 5,538,642 A | 7/1996 | Solie | |
| 5,591,404 A | 1/1997 | Mathewson | |
| 5,681,467 A | 10/1997 | Solie et al. | |
| 5,782,791 A | 7/1998 | Peterson et al. | |
| 6,218,465 B1* | 4/2001 | Kobayashi et al. | ......... 524/847 |
| 6,274,055 B1 | 8/2001 | Zuk, Jr. | |
| 6,342,122 B1 | 1/2002 | Riley et al. | |
| 6,358,660 B1 | 3/2002 | Agler et al. | |
| 6,423,472 B1 | 7/2002 | Kumpfmiller et al. | |
| 6,433,091 B1* | 8/2002 | Cheng | ......... 525/191 |
| 2003/0034293 A1* | 2/2003 | Simonetti | ......... 210/321.74 |
| 2005/0121380 A1* | 6/2005 | De La Cruz | ......... 210/321.83 |

FOREIGN PATENT DOCUMENTS

CA 2054930 5/1992
WO WO 02/40140 A1 11/2001

OTHER PUBLICATIONS

"Material Hardness"; University of Maryland; 2001. Printed from the web on Nov. 25, 2005. http://www.calce.umd.edu/general/Facilities/Hardness_ad_.htm.*
U.S. Provisional Appl. No. 60/390,451, filed Jun. 21, 2002.*

* cited by examiner

*Primary Examiner*—Krishnan S Menon
(74) *Attorney, Agent, or Firm*—J. David Wharton; Mark C. Young; Stinson Morrison Hecker LLP

(57) ABSTRACT

The present invention encompasses a leaf packet useful in forming a spiral filtration module, wherein the fold area of the leaf packet is reinforced with a UV cured adhesive. The invention further encompasses a spiral filtration module wherein the fold line, side seams and/or axial seams of the membranes utilized in the module are reinforced with a UV curable adhesive. The present invention further encompasses the method for making such leaf packet and such spiral filtration modules.

9 Claims, 2 Drawing Sheets

FOLD PROTECTION FOR SPIRAL FILTRATION MODULES UTILIZING UV CURED ADHESIVE AND METHOD OF PROVIDING SAME

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention is directed to the field of ultrafiltration technology, specifically to spiral filtration modules and methods for making the same.

The term "ultrafiltration" as used in the present application is intended to encompass microfiltration, nanofiltration, ultrafiltration, reverse osmosis and gas separation, unless otherwise indicated.

A typical ultrafiltration device comprises a plurality of spiral filtration modules through which a fluid to be filtered passes. Such spiral filtration modules consist of membrane sheets, permeate carriers and feed spacers wound around a permeate carrier tube. The membrane sheets generally comprise a membrane material integrally joined to a backing material. Each membrane sheet is typically folded in half along its width to present two membrane leaves, integrally joined along the fold line in a leaf packet. Membrane leaves in each leaf packet are oriented such that the membrane material sides of the sheet face each other.

Each permeate carrier is sandwiched between two membrane leaves, with one leaf provided by each of two adjacent leaf packets. The permeate carriers and membrane leaves are oriented such that the membrane material sides of the leaves faces away from the permeate carriers. The leaf side edges and the axial edges of the leaves distant from the permeate carrier tube are sealed around the permeate carrier to provide a permeate carrier envelope. The construction of the envelopes allows access to the permeate carriers only from a radial direction through the membrane leaves. A wet adhesive, typically a one-part or two-part epoxy or urethane, is commonly used to achieve the sealing. The permeate carrier material is usually a porous felt or fabric material, as is well-known in the art.

In most spiral filtration modules, each permeate carrier envelope is separated from adjacent permeate carrier envelopes by a feed spacer. The feed spacers are of a relatively large mesh size to accommodate fluid flow. The fluid passes along the feed spacers in a direction parallel to the axis of the permeate carrier tube. The permeate passes through the membrane surface of the permeate carrier envelopes and is directed to holes in the permeate carrier tube by the permeate carriers. Because the permeate carrier envelopes are sealed along the side edges and distant axial edges, fluid flowing through feed spacers sheets cannot access the permeate carrier tube except through the membrane leaves of the permeate carrier envelopes.

Some type of external restraining means such as a hard shell, straps or a bypass screen, or a combination thereof, may be used to hold the spirally wound components in tight formation around the tube. The spiral filtration module is loaded into a housing or pressure vessel which is operated at a slight pressure drop across the module as the fluid being filtered flows through. Concentrate is removed from one end of the module and permeate is removed from the permeate carrier tube.

Many applications of ultrafiltration technology involve food processing where sanitary conditions must be maintained at all times. This necessitates periodic cleaning with relatively harsh chemicals such as, by way of example only, chorine-containing compounds, other oxidizing agents, acids, alkalies and surfactants. The chemicals tend to degrade the membrane material, particularly in the areas that are subject to stress, such as the area along the fold line between the membrane leaves. This area where the two membrane leaves meet is typically referred to as the fold area. This fold area creates mechanical stresses in the membrane sheet and leads to cracking of the membrane sheet and leakage.

It is typical to employ some type of reinforcement in the fold area of the membrane sheet so as to reduce the mechanical stress and prolong the life of the membrane sheet. One technique is the utilization of reinforcing tapes, which are applied at the fold and extend outwardly from the fold a short distance to cover the fold area of the membrane sheet. A second method of membrane sheet reinforcement is to apply an adhesive to the fold area. Commonly used adhesives for such purposes are two-part room-temperature curing polyurethane or epoxy. Another method of membrane reinforcement involves densifying the membrane sheet in the fold area using a fusion process. Although tape, adhesive and fusion reinforcements provide some degree of reinforcement, tape tends to lose its adhesion and the use of adhesives and fusion processes require long cycles time during the manufacturing process and prevent the use of automated winding processes during manufacture.

BRIEF SUMMARY OF THE INVENTION

The present invention is directed to the use of flexible, chemically resistant, fast-curing UV curable adhesive to reinforce fold areas and/or seams of membranes utilized in spiral filtration modules.

DETAILED DESCRIPTION OF PREFERRED EMBODIMENT

Figure 1:
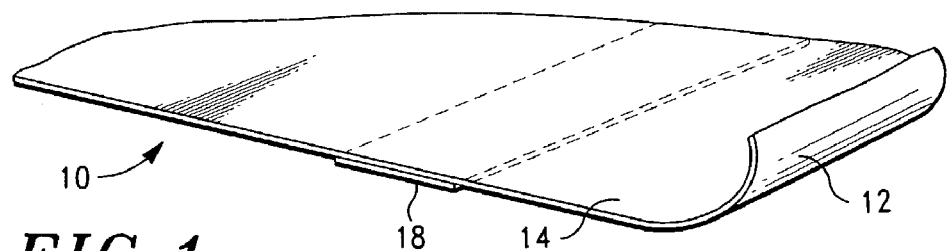
FIG. 1 is a fragmentary perspective view of a membrane sheet to which a UV curable adhesive has been applied.

Referring first to FIG. 1, a membrane sheet is designated generally by the number 10. Membrane sheet 10 preferably comprises membrane side 12 and backing side 14. Preferably the membrane side 12 comprises a membrane material and backing side 14 comprises a backing material, which are integrally joined by techniques well known in the art to form membrane sheet 10. Acceptable membrane materials and backing materials are also well known in the art.

Figure 2:
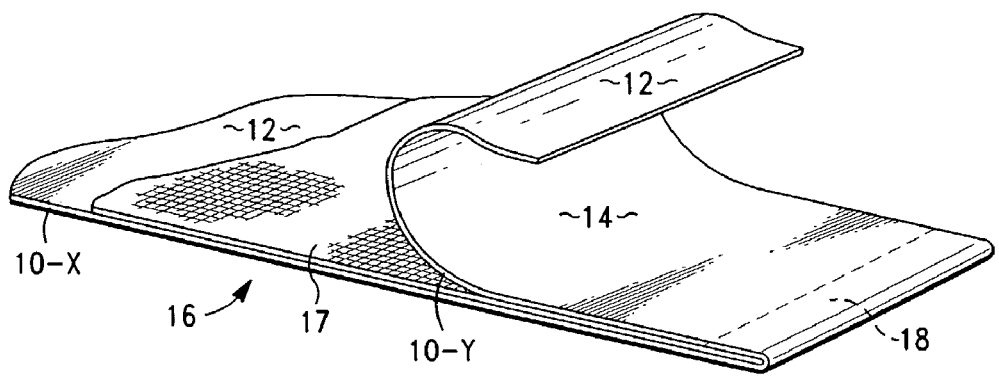
FIG. 2 is another fragmentary perspective view showing a leaf packet prepared according to the present invention.

Turning to FIG. 2, in general practice, a membrane leaf packet, generally designated by the number 16, is formed from membrane sheet 10. Membrane sheet 10 is divided to present first and second membrane leaves 10-X and 10-Y. This may be accomplished by folding along a line across the width of membrane sheet 10.

Preferably membrane sheet 10 is folded along its width to form first and second leaves 10-X and 10-Y of substantially the same size. As used herein, the term "membrane sheet" will be used to refer to the combination of leaves 10-X and 10-Y in a leaf packet. Further, the line dividing first leaf 10-X from second leaf 10-Y will be referred to as the "fold line" and the areas of the first and second leaves 10-X and 10-Y adjacent the fold line will be referred to as the "fold area."

Leaves 10-X and 10-Y of membrane sheet 10 are positioned relative to each other such that membrane side 12 of leaves 10-X and 10-Y face one another. In a preferred embodiment, feed spacer 17 is positioned between leaves 10-X and 10-Y within leaf packet 16. Feed spacer 17 generally has a relatively large mesh size to allow the fluid to be filtered to travel between membrane side 12 of leaves 10-X and 10-Y of membrane sheet 10. Although feed spacer 17 will be utilized in most spiral filtration modules, it is possible and known in the art to construct a module without feed spacer 17. The materials and construction of feed spacer 17 are well known in the art.

Prior to folding membrane sheet 10 to form leaf packet 16, a UV curable adhesive 18 is applied to a surface of membrane sheet 10, across the width of membrane sheet 10, as shown in FIG. 1. UV curable adhesive is preferably applied across the width of membrane sheet 10 on either side of the fold line in the fold area. FIG. 2 depicts UV curable adhesive 18 after membrane sheet 10 is folded to form leaf packet 16. It should be understood that in FIG. 1 the thickness of adhesive 18 relative to sheet 10, and the demarcation between adhesive 18 and backing side 14, have been exaggerated for purposes of illustration. In actual practice UV curable adhesive 18 may be dispensed, using a thickness-controlling die, or other apparatus or method known in the art, to a preferred thickness of about 0.002 to 0.020 inches, more preferably about 0.004 to 0.010 inch, most preferably about 0.005 inch. The width of the UV curable adhesive is preferably about 0.5 to 6 inches, more preferably about 1 to 4 inches, most preferably about 3 inches for ultrafiltration modules and 2 inches for reverse osmosis modules. The UV curable adhesive may be applied using a screen-printing apparatus, a draw blade, a spraying gun, a slot coater or any other suitable means as will be readily understood by one of ordinary skill in the art.

UV curable adhesive 18 may be applied to either side of sheet 10. In one embodiment of the present invention, UV curable adhesive 18 is applied to backing side 14 of membrane sheet 10. In the embodiment shown in FIGS. 1 and 2, UV curable adhesive 18 is applied to membrane side 12 of membrane sheet 10. Adhesives conventionally used for fold protection tend to fill the crevice along the fold line between the membrane leaves when applied to the membrane side of a membrane sheet and thereby bind the leaves to each other. In contrast, UV curable adhesive 18 coats membrane side 12 of leaves 10-X and 10-Y without filling the crevice along the fold line, such that leaves 10-X and 10-Y are not adhered to each other.

The UV curable adhesive of the present invention is flexible, has a hardness within the Shore A range after curing, and is resistant to chemicals, including chemicals selected from the group consisting of chlorine, acidic cleaning solutions and caustic cleaning solutions. Further, the UV curable adhesive has good initial and long-term adhesion to membrane sheet 10 and a short cure time. Preferably, the UV adhesive is cured by exposure to UV light for about 30 seconds or less, more preferably by exposure to UV light for between about 2 and 6 seconds. The UV light may be provided by any standard UV lamp. By way of example and not limitation, a fusion UV lamp may be used, or any UV lamp having an intensity of 200-5000 mW/cm·cm measured from 320-390 nm output. In a preferred embodiment, UV curable adhesive is an acrylic-type adhesive.

In one embodiment of the present invention, UV curable adhesive 18 comprises polybutadiene, preferably an amount between about 5 and 90 percent by weight, more preferably about 10 to 80 wt %, more preferably still about 20 to 60 wt %, and most preferably about 35 wt %. It should be understood that as used herein, polybutadiene refers to polybutadiene and/or its functionalized derivatives, unless specified to the contrary. It has been discovered that by increasing the amount of polybutadiene, the flexibility of the cured adhesive increases. Preferably the polybutadiene is provided as an acrylate or (meth)acrylate-terminated polybutadiene oligomer or an epoxidized polybutadiene, most preferably as a (meth)acrylate-terminated polybutadiene. Although the embodiment of the present invention described herein comprises polybutadiene, other components that produce a UV curable adhesive possessing the desired properties may be used consistent with the present invention, for example compounds selected from the group consisting of acrylate or (meth)acrylate-terminated polyisoprenes, chloroprenes, polyethers, polyesters and their copolymers.

The (meth)acrylate-terminated polybutadiene preferably has a molecular weight ranging from 800 to 4000 and a glass transition temperature of less than 0° C. Most preferably the (meth)acrylate-terminated polybutadiene is a polybutadiene dimethacrylate oligomer. By way of example, and not limitation, polybutadiene dimethacrylate oligomers that may be used with the present invention are sold under the product name HYCAR VTB by B F Goodrich and as the CN series of polybutadiene dimethacrylate oligomers by Sartomer.

In the most preferred embodiment, an acrylate or (meth)acrylate, a vinyl monomer, an initiator/stabilizer and a photoinitiator are combined with the (meth)acrylate-terminated polybutadiene elastomer to form a homogenous resin solution.

In such embodiment, the acrylate or (meth)acrylate is preferably a high boiling point acrylate or (meth)acrylate selected from the group consisting of 2-ethyl hexyl (meth)acrylate, hydroxyethyl (meth)acrylate, cyclohexyl (meth)acrylate and multi-functional acrylates such as trimethylolpropionate triacyrlate or other acrylates with high functionality known in the art. The UV curable adhesive preferably comprises about 5 to 90 wt % acrylate or (meth)acrylate, more preferably 10 to 70 wt %, more preferably 20 to 40 wt % and most preferably about 30 wt %.

The vinyl monomer is preferably selected from the group consisting of styrene, divinylbenzene, n-methylstyrene, chlorostyrene, vinyl acetate, acrylonitrile and vinyl ether. The UV curable adhesive preferably comprises about 5 to 80 wt % vinyl monomer, more preferably 10 to 60 wt %, more preferably 20 to 40 wt %, and most preferably about 30 wt %.

The photoinitiator is preferably selected from the group consisting of 1-hydroxycyclohexyl phenyl ketone (for example that sold by Ciba-Geigy under product name HCPK, Irgacure 184) and 2-hydroxy-2-methyl-1-phenylpropan-1-one (for example that sold by Ciba Geigy under the product name HMPP, Darocur 1173). The UV curable adhesive preferably comprises about 0.2 to 9 wt % photoinitiator, more preferably 0.5 to 7 wt %, more preferably 1 to 5 wt % and most preferably about 3 wt %.

The inhibitor/stabilizer is preferably a free-radical polymerization inhibitor selected from the group consisting of hydroquinone, methylhydroquinone and BHT. The UV curable adhesive preferably comprises about 0.1 to 0.2 wt % inhibitor/stabilizer, more preferably 0.2 to 0.5 wt % and most preferably about 0.005 wt %.

Preferably the UV curable adhesive additionally comprises acrylic acid or methacrylic acid. In such case, the UV curable adhesive preferably comprises about 0.1 to 10 wt % acrylic acid or methacrylic acid, more preferably 0.5 to 7 wt %, more preferably 1 to 5 wt % and most preferably about 3 wt %.

Figure 3:
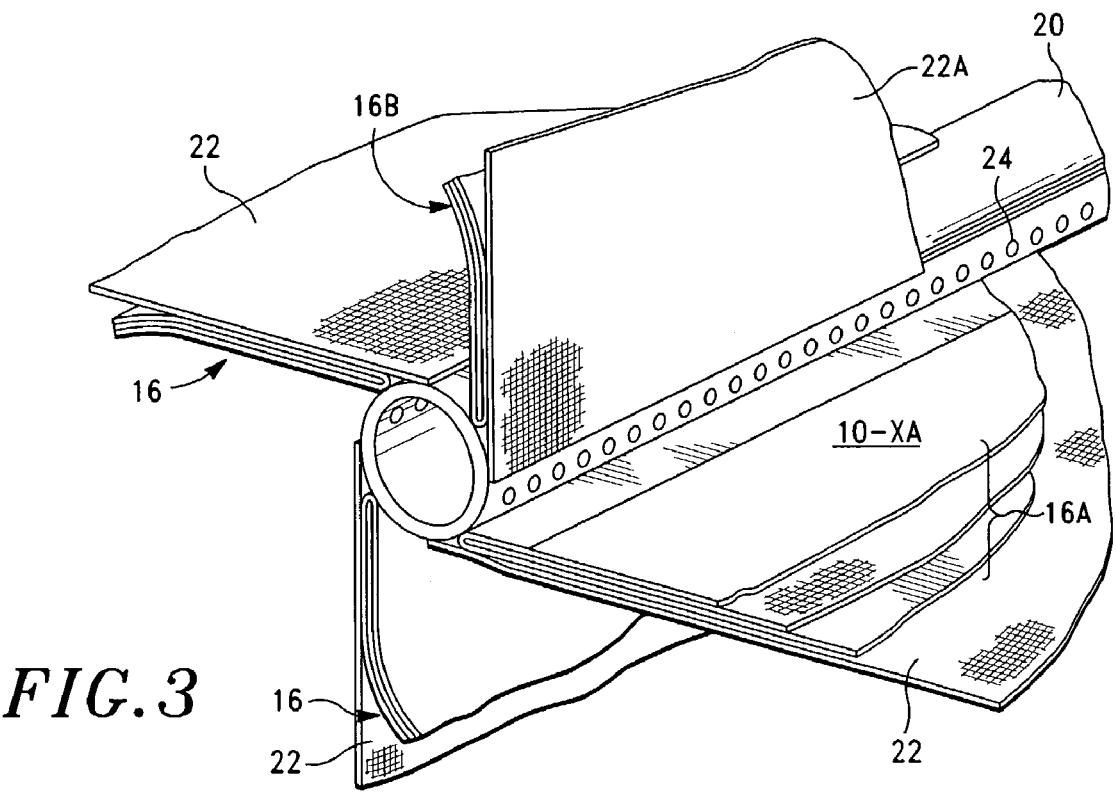
FIG. 3 is a fragmentary perspective view of a permeate carrier tube around which a plurality of leaf packets and permeate carriers are positioned.

Turning to FIG. 3, a permeate carrier tube 20 is shown with leaf packets 16 circumferentially spaced around it, with the fold line of each leaf packet 16 positioned adjacent to tube 20. Each permeate carrier 22 is positioned between membrane leaf 10-X of a first membrane sheet and membrane leaf 10-Y of an adjacent membrane sheet to direct permeate to the interior of tube 20 through openings 24. The permeate carriers are sealed between adjacent membrane leaves to form a permeate carrier envelope.

Figure 4:
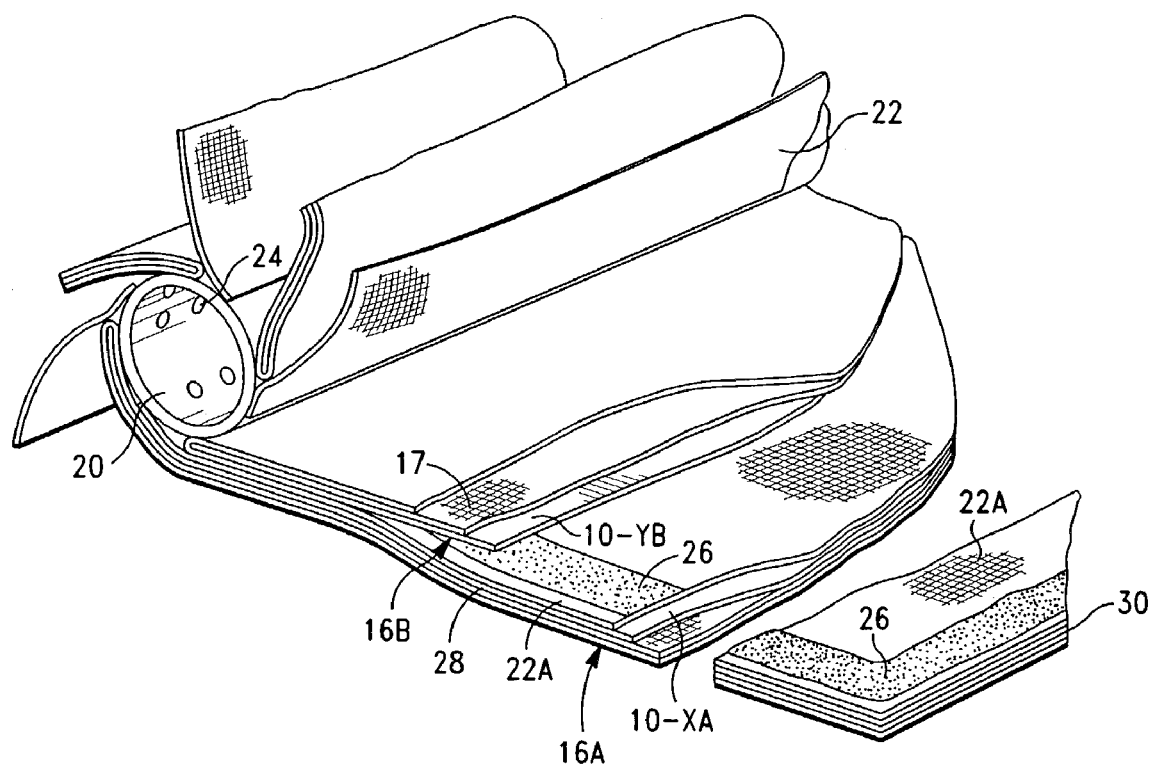
FIG. 4 is a fragmentary perspective view of a permeate carrier tube around which a plurality of leaf packets and permeats carriers are positioned, showing the details of the construction of the individual permeate carrier envelopes.

As shown in FIG. 4, the permeate carrier envelopes of the complete spiral module are formed by firstly positioning a permeate carrier 22A adjacent a first membrane leaf 10-XA of a leaf packet 16A. A quantity of adhesive 26 is applied along the side edges 28 and/or across the distant axial edge 30 of first leaf 10-XA and/or permeate carrier 22A, as depicted in FIG. 4.

Figure 5:
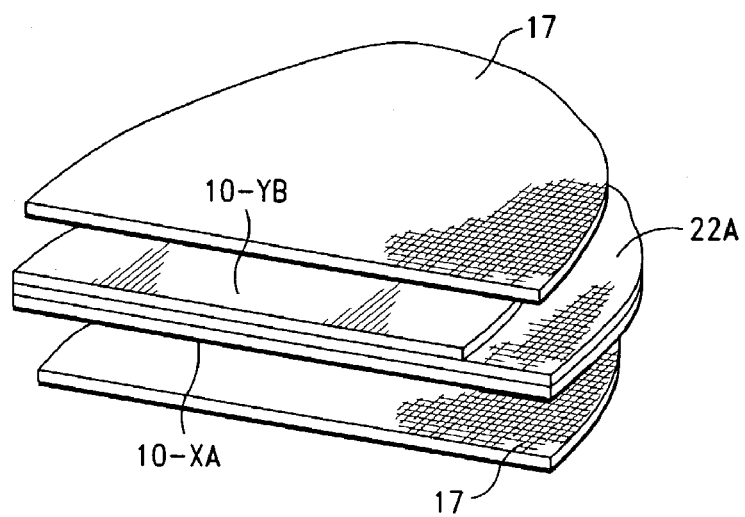
FIG. 5 is an exploded fragmentary perspective view of a permeate carrier envelope sandwiched between two feed spacers.

A second leaf 10-YB of adjacent leaf packet 16B is brought into contact with adhesive 26 so as to form a completed permeate carrier envelope comprised of permeate carrier 22A sealed between the two leaves 10-XA and 10-YB. In a preferred embodiment, each permeate carrier envelope is separated from an adjacent permeate envelope by a feed spacer 17. The construction of a permeate carrier envelope between feed spacers 17 is depicted in FIG. 5. After all of the membrane leaves have been assembled into permeate carrier envelopes in this matter, the permeate carrier envelopes and feed spacers 17 are wound about tube 20.

In the preferred embodiment adhesive 26 is a UV curable adhesive as discussed with respect to UV curable adhesive 18. Adhesive 26 may be the same or different UV curable adhesive as UV curable adhesive 18. UV curable adhesive used as adhesive 26 may be applied and cured by exposure to UV light, as described with respect to UV curable adhesive 18. UV curable adhesive 26 is preferably applied at a thickness between about 0.005 to 0.2 inch, more preferably 0.01 to 0.08, most preferably about 0.03 inch and a width of about 0.5 to 3.5 inches, more preferably 1 to 2.5 inches and most preferably about 1.5 inches.

The invention thus encompasses a method of preparing a leaf packet useful in forming a spiral filtration module, wherein the fold area of the leaf packet is reinforced with a UV cured adhesive. Such method comprises providing a membrane sheet and applying a UV curable adhesive to a surface of the membrane sheet across the width of the membrane sheet. The UV curable adhesive is then exposed to UV radiation to cure the UV curable adhesive. The membrane sheet is divided across the width of the membrane sheet on a fold line, wherein the fold line is within the area of the membrane sheet to which the UV curable adhesive is applied. In a preferred method the membrane sheet is folded after the application and curing of the UV curable adhesive.

The invention also encompasses a method for preparing a spiral filtration module using a UV curable adhesive to seal the side and/or axial seams of the permeate carrier envelopes. The method comprises providing at least two membrane sheets, which sheets are divided by a fold line across the width of the membrane sheets to present first and second membrane leaves. A permeate carrier is then positioned between adjacent membrane sheets and the membrane leaves adjacent the permeate carrier are joined along their side edges and distal axial edge by a UV curable adhesive. To join the membrane leaves, a UV curable adhesive is applied along the side and/or distant axial edges of a first leaf of a first membrane and/or the permeate carrier. A second leaf of the adjacent membrane sheet is brought into contact with the adhesive to seal the permeate carrier between the leaves of adjacent membrane sheets to form a permeate carrier envelope. A feed spacer may be positioned between adjacent permeate carrier envelopes. The permeate carrier envelopes, comprising membrane sheets and permeate carriers, and any feed spacers are wound around a permeate carrier tube. In addition, the adhesive is exposed to UV radiation to cure the adhesive.

The UV curable adhesive described herein can be cured in less than 30 seconds, which is much shorter than the curing or fusing time required for conventional reinforcing and adhesive materials utilized in spiral filtration module construction. As a result, the UV curable adhesive can be used to reinforce folds and/or seams of leaf packets using automated winding processes. Further, the UV curable adhesive of the present invention is flexible and durable after curing, which reinforces the membrane sheets and prevents leakage and eventual unit failure. The combination of cure time, flexibility, hardness and chemical resistance provided by the present invention has heretofore not been achieved with standard reinforcing and adhesive materials.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method of preparing a leaf packet for a spiral filtration module comprising the steps of:
providing a membrane sheet;
applying a UV curable adhesive to a surface of said membrane sheet, across the width of said membrane sheet, wherein said UV curable adhesive is comprised of a material selected from the group consisting of epoxidized polybutadiene, acrylate-terminated polybutadiene, methacrylate-terminated polybutadiene, acrylate-terminated polyisoprenes, methacrylate-terminated polyisoprenes, acrylate-terminated chloroprenes, methacrylate-terminated chloroprenes, acrylate-terminated polyethers and their copolymers, methacrylate-terminated polyethers and their copolymers, acrylate-terminated polyesters and their copolymers, methacrylate-terminated polyesters and their copolymers;

exposing said adhesive to UV radiation to cure said adhesive; and dividing said membrane sheet across the width of said membrane sheet along a line to provide first and second membrane leaves, wherein said line is within the portion of said membrane sheet to which said adhesive is applied in said applying step, wherein said cured adhesive reinforces said membrane sheet in the area of said line.

2. The method of claim 1, wherein after said exposing step, said UV curable adhesive remains flexible, possesses a hardness in the Shore A range and possesses resistance to chemicals selected from the group consisting of chlorine, acidic cleaning solutions and caustic cleaning solutions.

3. The method of claim 1 wherein said exposing step comprises exposing said UV curable adhesive to the UV radiation for up to 30 seconds.

4. The method of claim 1, wherein said line is a fold line.

5. The method of claim 1, wherein said membrane sheet comprises a membrane side and a backing side, wherein said dividing step comprises folding said membrane sheet so that said membrane sides of said first and second membrane leaves face each other and wherein said applying step comprises applying said adhesive to said membrane side of said membrane sheet, whereby said first and second membrane leaves do not adhere to each other.

6. A leaf packet useful in forming a spiral filtration module comprising:

a membrane sheet presenting first and second membrane leaves, wherein said first and second membrane leaves are divided by a line across the width of said membrane sheet; and a strip of UV curable adhesive affixed to the surface of each said leaf adjacent said line, wherein said UV curable adhesive is comprised of a material selected from the group consisting of epoxidized polybutadiene, acrylate-terminated polybutadiene, methacrylate-terminated polybutadiene, acrylate-terminated polyisoprenes, methacrylate-terminated polyisoprenes, acrylate-terminated chloroprenes, methacrylate-terminated chloroprenes, acrylate-terminated polyethers and their copolymers, methacrylate-terminated polyethers and their copolymers, acrylate-terminated polyesters and their copolymers, methacrylate-terminated polyesters and their copolymers, and wherein said adhesive has been exposed to UV radiation to cure said adhesive, and the cured adhesive reinforces said membrane sheet in the area of said line.

7. The leaf packet of claim 6, wherein said UV curable adhesive is flexible, possesses a hardness in the Shore A range and possesses resistance to chemicals selected from the group consisting of chlorine, acidic cleaning solutions and caustic cleaning solutions.

8. The leaf packet of claim 6 wherein said UV curable adhesive has been exposed to the UV radiation for up to 30 seconds.

9. The leaf packet of claim 6, wherein said membrane sheet comprises a membrane side and a backing side, wherein membrane sheets are folded along said line so that said membrane sides of said first and second membrane leaves face each other and wherein said adhesive is affixed to said membrane side of said membrane sheet, whereby said first and second membrane leaves do not adhere to each other.

* * * * *